J. SCHAUB.
ARTIFICIAL FUEL AND METHOD OF MAKING SAME.
APPLICATION FILED JULY 17, 1917.

1,262,267.

Patented Apr. 9, 1918.
3 SHEETS—SHEET 2.

INVENTOR
Jacob Schaub
BY
Henry M. Bonham
his ATTORNEY

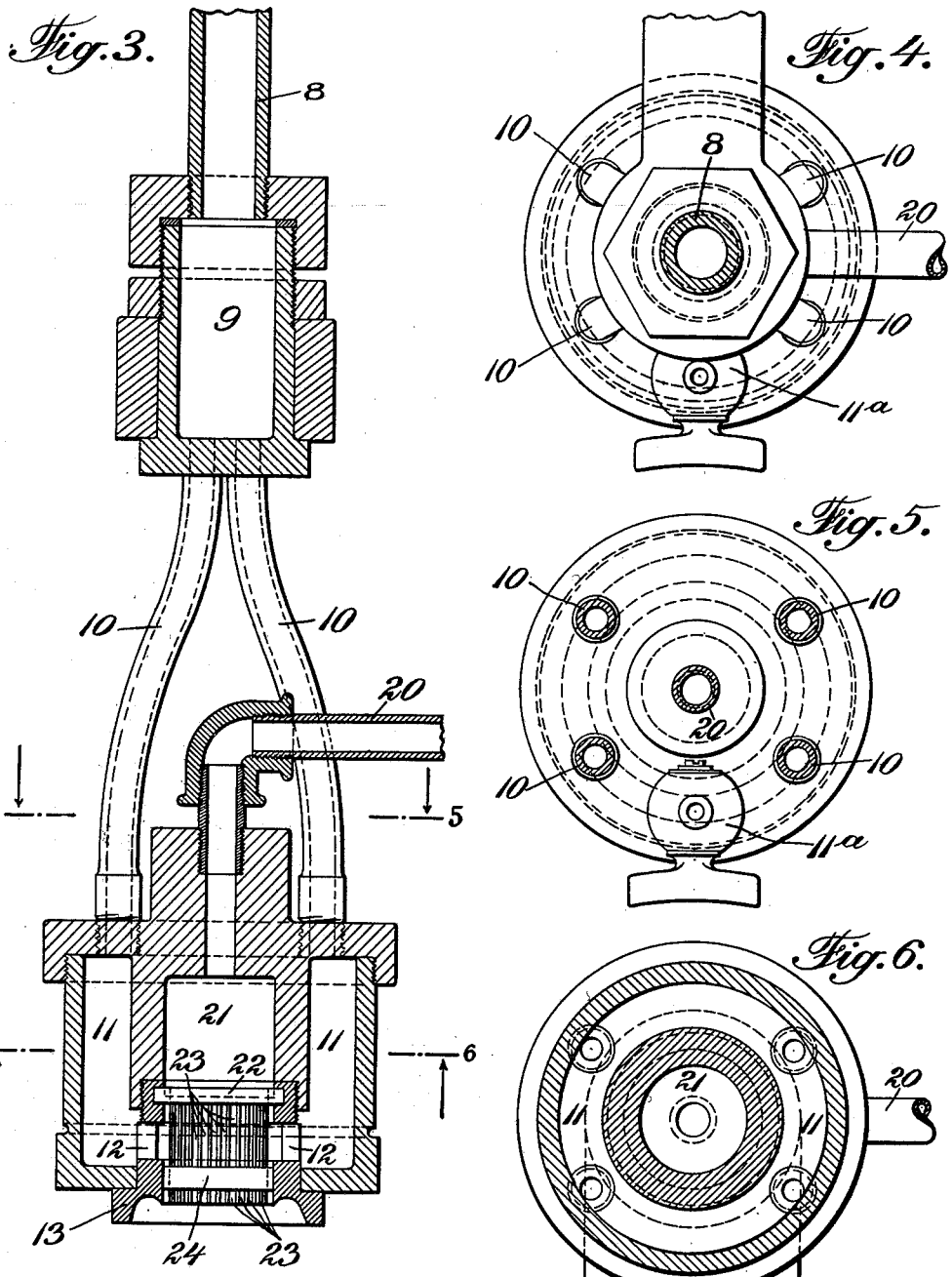

UNITED STATES PATENT OFFICE.

JACOB SCHAUB, OF NEWARK, NEW JERSEY, ASSIGNOR TO AMERICAN LINSEED COMPANY, A CORPORATION OF NEW JERSEY.

ARTIFICIAL FUEL AND METHOD OF MAKING SAME.

1,262,267.  Specification of Letters Patent.  Patented Apr. 9, 1918.

Application filed July 17, 1917. Serial No. 181,033.

*To all whom it may concern:*

Be it known that I, JACOB SCHAUB, a citizen of the United States, and a resident of Newark, in the county of Essex and State of New Jersey, have invented certain new and useful Improvements in Artificial Fuel and Methods of Making Same, of which the following is a specification.

The objects of my invention are to produce an artificial fuel which may be easily ignited, is rich in heat units, produces a high heat, does not fuse while burning, and leaves a minimum of residue or ash when consumed.

Figure 1:
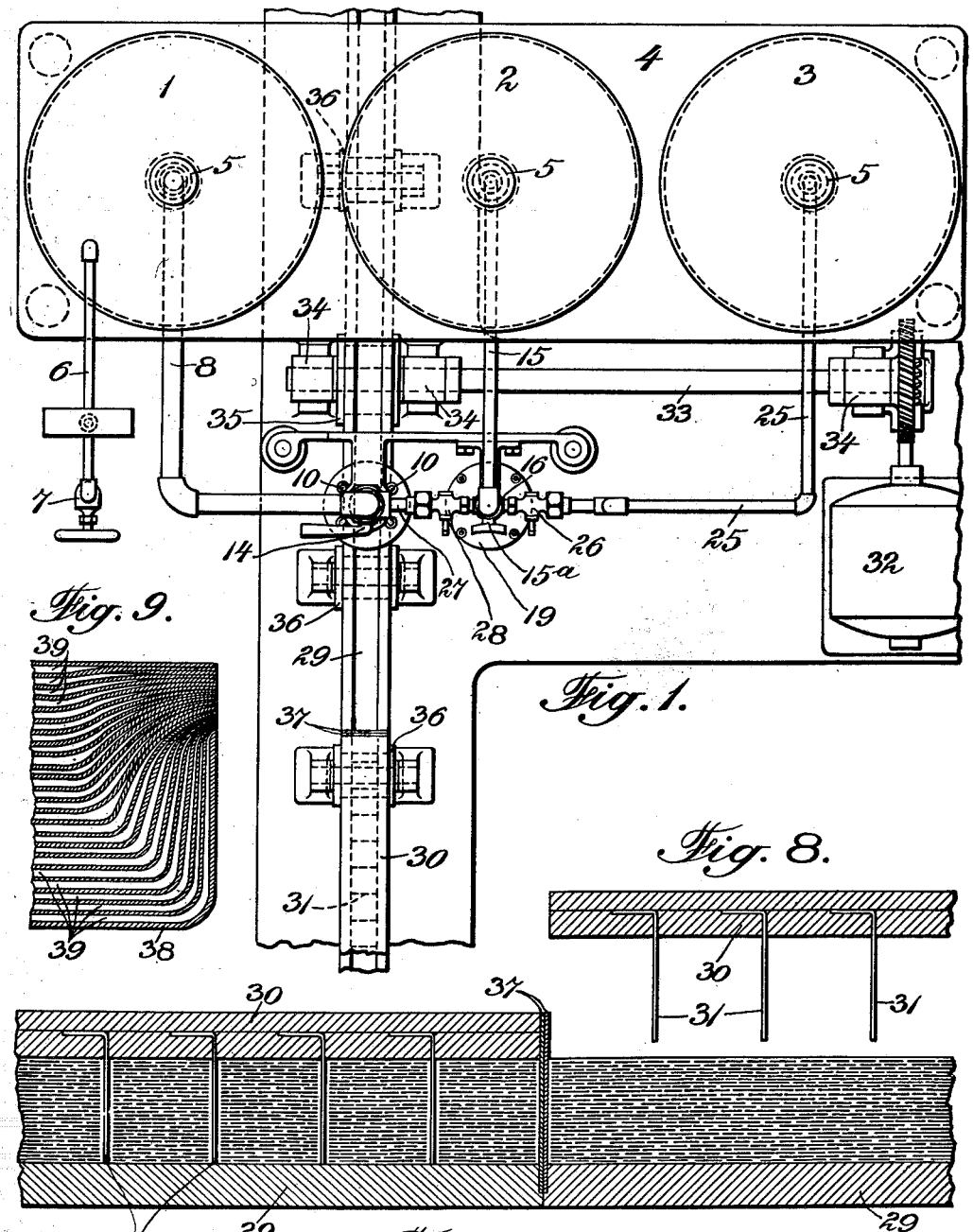
Figure 2:
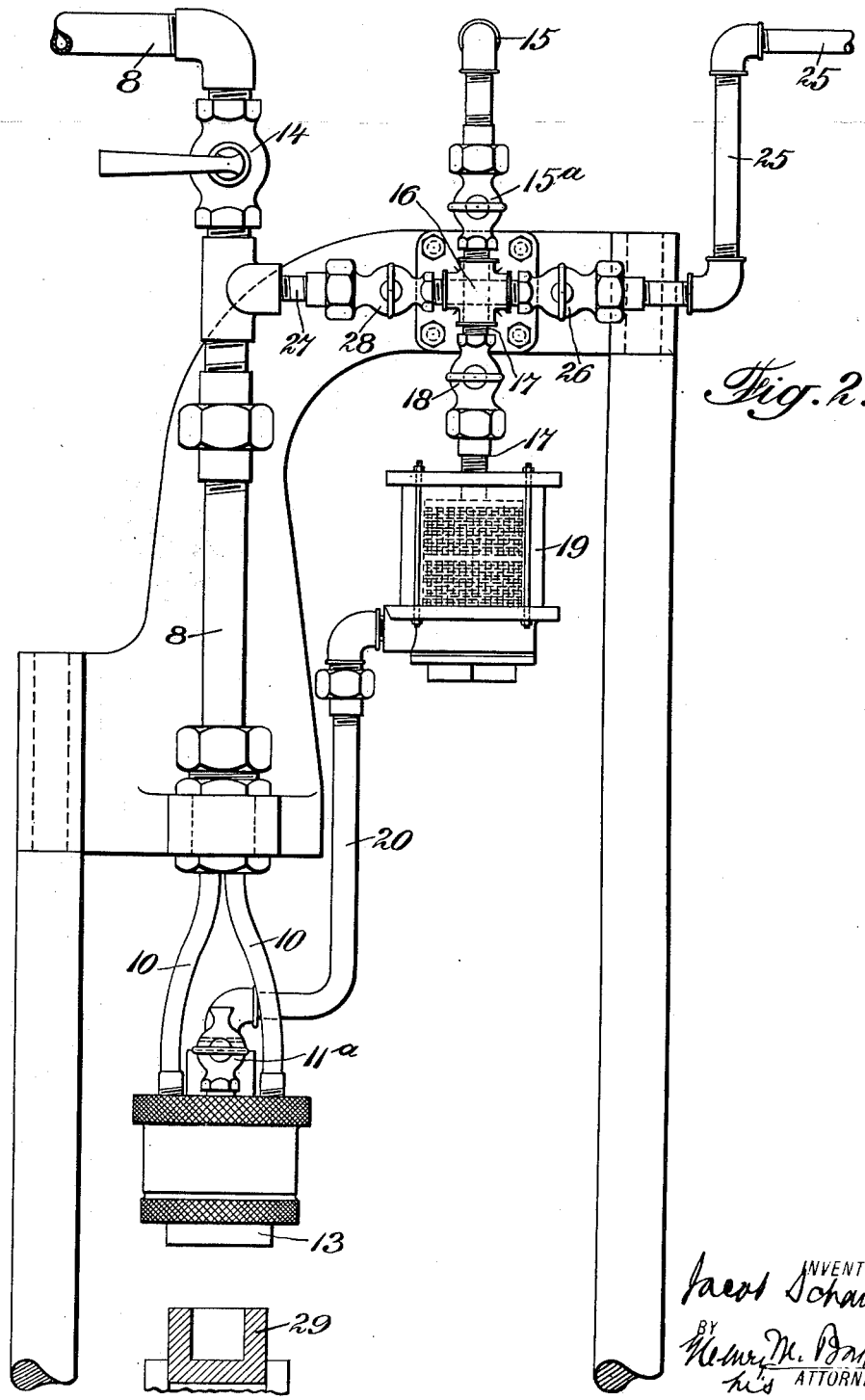

With these objects in view I place approximately forty-six parts of commercial methyl alcohol in a suitable vessel and add approximately four parts of cellulose, having a content of nitrogen, which renders it soluble therein, preferably cellulose-pentanitrate, and agitate until the cellulose-pentanitrate has been dissolved. I then continue the agitation and add a sufficient quantity of commercial ethyl alcohol, containing from five to ten per centum of water, to bring the colloid to the desired viscosity. This usually requires about twelve parts. I may then, by the addition of additional ethyl alcohol, transform the colloid into a solid jelly which may be cut into cubes of the desired dimensions. I prefer, however, to form the colloid which has been brought to the desired degree of viscosity, into a tubulous mass and introduce into the tubules and fill them with ethyl alcohol, the tubules being of such dimensions that they will be capillary in their action and then seal the ends of the tubules when the resultant product is cut into cubes, and for this purpose I use the mechanism shown in the accompanying drawings, in which Figure 1 is a plan view of my apparatus; Fig. 2 an elevation of the forming die and the pipes for feeding colloid and ethyl alcohol thereto; Fig. 3 a sectional elevation of the forming die; Fig. 4 a top plan view of the forming die; Fig. 5 a sectional view on the line 5—5 of Fig. 3; and Fig. 6 a sectional view on the line 6—6 of Fig. 3; Fig. 7 a sectional view of a portion of the mold and cutting mechanism; Fig. 8 a detailed sectional view of the cutting mechanism and Fig. 9 an inverted sectional view of a portion of one of the cubes of finished material.

The apparatus shown and described in this application is more elaborately shown and described, and is claimed in my co-pending application filed July 17, 1917, Serial No. 181,034.

Similar numerals of reference refer to similar parts throughout the accompanying drawings.

The tanks 1, 2 and 3 are supported on a table 4, at a suitable elevation. Each of these tanks is provided with a cap 5, which may be removed when the tanks are to be filled and then replaced. The tank 1 is designed to hold the colloid. Compressed air may be introduced into this tank from any suitable source, through the pipe 6, which is provided with a cut-off cock 7, by which the supply of compressed air may be cut off or controlled. A pipe 8 leads from the bottom of the tank 1 to the chamber 9, from whence pipes 10 lead to a chamber 11 which is in communication through the ports 12 with the forming die 13. The cock 11ª is for the purpose of permitting air to escape from the chamber 11 while the chamber is being filled with colloid. The pipe 8 is provided with a cut-off cock 14. A pipe 15 leads from the bottom of the tank 2 to the union 16 and is provided with a cut-off cock 15ª, and a pipe 17 provided with a cut-off cock 18 leads from the union 16 to the strainer 19. From the strainer 19 a pipe 20 leads to the chamber 21 in the forming die 13. A disk 22 is mounted in a suitable chamber in the die 13, and secured in the disk 22 are minute pipes 23, spaced equally distant from each other. The lower ends of the pipes 23 are maintained in spaced relation to each other by the ring 24, which fits accurately in the bore of the die, the pipes 23 thus forming the core of the die, the upper ends of the minute pipes 23 being in open communication with the chamber 21 and the elevation of the tanks 1, 2 and 3 being such that the ethyl alcohol contained in the tank 2 and the methyl alcohol in the tank 3 will flow freely to the apparatus by gravity, under suitable head.

Leading from the bottom of the tank 3 to the union 16 is a pipe 25, provided with a cut-off cock 26, and leading from the union 16 to the pipe 8 is a pipe 27, provided with a cut-off cock 28. 29 is a trough shaped mold, the cover 30 of which is provided with cutting blades 31. 32 is an electric motor which is geared to a shaft 33, mounted in suitable bearings 34. Secured to the shaft 33 against rotation is a pulley 35, which is grooved to receive the molding trough 29, as are likewise the idle pulleys 36, which are adapted to support the molding trough 29, as it passes under the discharge orifice of the die 13.

The molding troughs are provided at their ends with end walls 37, so that as one molding trough is carried along another is placed end to end against it, as shown in Fig. 7, and the process is a continuous one.

In Fig. 9 I have shown an inverted section of one end of the cubes of fuel 38, in which tubules 39 have been formed by the minute tubes 23 as the material passes through the orifice of the die. This figure clearly shows the manner in which the tubules are drawn and collapsed when the material is cut in the mold. I have also found that by permitting the material in the molding trough to solidify to a certain stage, the material may be cut into cubes without substantially drawing the material and collapsing the tubes and that the colloid in the mass which has not yet come in contact with the ethyl alcohol will be drawn by the cutter blade over the mouths of the tubules so as to effectually seal them. The tubules being capillary in their action, there is practically no tendency of the ethyl alcohol to flow from the tubules even if they are not completely sealed.

The operation of my apparatus is as follows:—

Colloid of the desired viscosity is introduced into the tank 1, ethyl alcohol in the tank 2, and methyl alcohol in the tank 3. The cocks 26, 15$^a$, 28 and 14 being then closed, the cock 7 is then opened and a suitable pressure obtained in the tank 1. The cock 14 is then opened and when the colloid begins to issue from the die the cock 15$^a$ is opened, permitting the ethyl alcohol to flow from the tank 2 through the pipe 15, the union 16 and the pipe 17, to the strainer 19, where any impurities are removed. From the strainer 19 the ethyl alcohol then flows through the pipe 20 to the chamber 21, and out through the minute pipes 23 into the tubules formed in the colloid by the pipes 23, the colloid passing through the die also exerting a siphoning effect upon the ethyl alcohol. From the orifice of the die the material then falls into the molding trough 29 where it is formed into rectangular rods, the ethyl alcohol in the tubules rapidly solidifying the interior surface of the tubules. When the solidification has progressed to the proper stage the cover 30 is placed over the molding trough and the blades 31 forced down until they cut the material into cubes of the desired dimensions. In being forced down they collapse the tubules and drag over the mouths of the tubules a sufficient quantity of the unsolidified colloid to effectually seal the mouths of the tubules. When the solidification has been sufficiently completed the cubes may be removed from the molding trough. If preferred, they may then be dipped in colloid which, when it solidifies, will form an envelop about the cubes.

When all of the colloid has been fed from the tank 1 or when the desired amount of fuel has been manufactured, it is necessary to remove the colloid from the die and preferably this should be done before it solidifies. This is accomplished by closing the cocks 14, 15$^a$ and 18, and opening the cocks 26 and 28 and permitting methyl alcohol to flow through the pipe 8, chamber 9, pipe 10, chamber 11, passages 12 and the die 13, until the colloid collected therein is redissolved and removed. The cocks 28 and 14 should then be closed, the cock 18 opened, and methyl alcohol permitted to flow from the tank 3 until any colloid which may have collected has been removed. All of the cocks should then be closed.

I claim:

1. An artificial fuel consisting of cellulose having a nitrogen content which renders it soluble in methyl alcohol, methyl alcohol and ethyl alcohol, substantially as described.

2. An artificial fuel consisting of cellulose-pentanitrate, methyl alcohol and ethyl alcohol.

3. An artificial fuel comprising in combination a tubulous envelop of combustible material, and a combustible liquid inclosed in the tubules of the envelop.

4. An artificial fuel comprising in combination a tubulous envelop of combustible material which will not fuse while burning, and a combustible liquid inclosed in the tubules of the envelop.

5. An artificial fuel comprising in combination a tubulous envelop of combustible material which will not fuse while burning, the tubules in the envelop being of such dimensions that they are capillary in their action, and a combustible liquid inclosed in the tubules of the envelop.

6. The process of producing artificial fuel which consists in dissolving in methyl alcohol cellulose having a nitrogen content which renders it soluble therein, bringing the colloid to the desired viscosity by the addition of ethyl alcohol and forming the colloid into a tubulous mass and injecting ethyl alcohol into the tubules in the colloid.

7. The process of producing artificial fuel which consists in dissolving in methyl alcohol cellulose-pentanitrate, bringing the mixture to the desired viscosity by the addition of ethyl alcohol, forming the colloid into a tubulous mass and injecting ethyl alcohol into the tubules in the colloid.

8. The process of producing artificial fuel which consists in dissolving in methyl alcohol cellulose having a nitrogen content which renders it soluble therein, bringing the colloid to the desired viscosity by the addition of ethyl alcohol, passing the colloid through a die and forming the colloid into a tubulous mass and injecting ethyl alcohol into the tubules formed in the colloid.

9. The process of producing artificial fuel which consists in dissolving in methyl alcohol cellulose having a nitrogen content which renders it soluble therein, bringing the colloid to the desired viscosity by the addition of ethyl alcohol, passing the colloid through a die and forming it into a tubulous envelop the tubules of which are capillary in their action, and injecting ethyl alcohol into the tubules in the colloid.

10. The process of producing artificial fuel which consists in dissolving in methyl alcohol cellulose having a nitrogen content which renders it soluble therein, and solidifying the colloid so formed with ethyl alcohol.

Signed at New York city, in the county of New York and State of New York, this 11th day of July, 1917.

JACOB SCHAUB.

Witnesses:
MARGARET A. HECK,
PAUL R. JAMES.